United States Patent
Hironaka

(10) Patent No.: US 9,058,238 B2
(45) Date of Patent: Jun. 16, 2015

(54) ELECTRONIC DEVICE WITH CUSTOMIZABLE EMBEDDED SOFTWARE AND METHODS THEREFOR

(75) Inventor: Takashi Hironaka, San Diego, CA (US)

(73) Assignee: Sony Corporation, Tokyo (JP)

(*) Notice: Subject to any disclaimer, the term of this patent is extended or adjusted under 35 U.S.C. 154(b) by 376 days.

(21) Appl. No.: 12/903,869

(22) Filed: Oct. 13, 2010

(65) Prior Publication Data

US 2012/0096104 A1    Apr. 19, 2012

(51) Int. Cl.
*G06F 15/167* (2006.01)
*G06F 9/445* (2006.01)
*H04N 21/442* (2011.01)
*H04N 21/658* (2011.01)
*H04N 21/443* (2011.01)
*H04N 21/472* (2011.01)
*H04N 21/81* (2011.01)

(52) U.S. Cl.
CPC .............. *G06F 8/665* (2013.01); *H04N 21/443* (2013.01); *H04N 21/472* (2013.01); *H04N 21/8166* (2013.01); *H04N 21/4424* (2013.01); *H04N 21/6582* (2013.01)

(58) Field of Classification Search
CPC .......... G06F 2003/0697; G06F 21/572; G06F 3/123; G06F 8/65; G06F 11/1433; H04N 21/23617; H04N 21/26291; H04N 21/818
USPC .................. 709/212, 221, 247; 725/116, 126; 717/171, 168
See application file for complete search history.

(56) References Cited

U.S. PATENT DOCUMENTS

| | | | |
|---|---|---|---|
| 7,197,715 B1 | 3/2007 | Valeria | |
| 7,669,195 B1* | 2/2010 | Qumei | 717/170 |
| 7,814,474 B2* | 10/2010 | Chen et al. | 717/168 |
| 7,886,093 B1* | 2/2011 | Chen | 710/68 |
| 8,074,212 B2* | 12/2011 | Li et al. | 717/168 |
| 8,332,839 B2* | 12/2012 | Daftardar | 717/173 |
| 2002/0149707 A1 | 10/2002 | Van Der Wijst et al. | |
| 2003/0131083 A1* | 7/2003 | Inui et al. | 709/221 |
| 2003/0154471 A1* | 8/2003 | Teachman et al. | 717/171 |
| 2004/0015952 A1* | 1/2004 | Lajoie et al. | 717/171 |
| 2005/0132351 A1* | 6/2005 | Randall et al. | 717/168 |
| 2005/0144612 A1* | 6/2005 | Wang et al. | 717/168 |
| 2005/0251799 A1* | 11/2005 | Wang | 717/168 |
| 2007/0050762 A1* | 3/2007 | Chen et al. | 717/169 |
| 2007/0089109 A1* | 4/2007 | Fontijn | 717/177 |
| 2007/0118683 A1* | 5/2007 | Yang et al. | 711/103 |

(Continued)

FOREIGN PATENT DOCUMENTS

JP        2005-341026 A    12/2005

*Primary Examiner* — Wing F Chan
*Assistant Examiner* — Benjamin M Thieu
(74) *Attorney, Agent, or Firm* — Fitch, Even, Tabin & Flannery LLP

(57) ABSTRACT

An electronic device comprising: a central processing unit; memory in data communication with the central processing unit; a network connector in data communication with the central processing unit; a firmware image stored in a compressed format within the memory, wherein the firmware image includes a plurality of software components; and an update agent stored within the memory and configured to provide a list of software components for communication out the network connector, wherein the electronic device is configured to communicate the list of software components out the network connector and receive a modified firmware image in a compressed format that includes at least one additional software component.

17 Claims, 5 Drawing Sheets

(56) References Cited

U.S. PATENT DOCUMENTS

| | | |
|---|---|---|
| 2007/0224969 A1* | 9/2007 | Rao .............................. 455/411 |
| 2008/0052698 A1* | 2/2008 | Olson et al. ................... 717/168 |
| 2008/0098160 A1* | 4/2008 | Slyz et al. ..................... 711/103 |
| 2010/0013996 A1 | 1/2010 | Kang et al. |
| 2010/0058421 A1* | 3/2010 | Hastings et al. ............... 725/116 |
| 2010/0115576 A1* | 5/2010 | Hale et al. ..................... 725/152 |
| 2011/0061082 A1* | 3/2011 | Heo et al. ........................ 725/87 |
| 2011/0119702 A1* | 5/2011 | Jang et al. ....................... 725/32 |
| 2011/0167419 A1* | 7/2011 | Ishikawa ....................... 717/171 |

* cited by examiner

ELECTRONIC DEVICE WITH CUSTOMIZABLE EMBEDDED SOFTWARE AND METHODS THEREFOR

FIELD

The present patent document relates to a device with customizable embedded software and methods therefor.

BACKGROUND

In the quickly changing technology landscape that electronic device designers and manufacturers operate in, it may be difficult to produce a product that includes all the functionality desired by customers. Even if the device is created with all the desirable features a customer desires at the time of purchase, the customer may wish for additional functionality after the device has been purchased.

Furthermore, assuming resources like memory are not unlimited on the device, manufacturers may not be able to implement all the desired features and are forced to try and determine which features and functionality will be desired most by customers. Regardless of whether manufactures make this determination correctly or not, there will always be functionality not included on the device that is desired by some customers.

One way to provide additional functionality and allow an electronic device to adapt to the changing demands of customers is to provide the ability to update the firmware or embedded software of the electronic device. The ability to update the firmware of an electronic device provides the ability to increase the functionality of the device even after the customer has purchased and received the device. In addition to creating additional functionality, the ability to update the firmware also allows errors or bug fixes to be performed after the device has been sold and shipped to the customer.

Additional functionality may be provided to the electronic device in the form of applications that are designed to run on the electronic device and perform additional functions or features. Smart phones are a great example of how added functionality may be provided by using additional applications. Manufacturers of smart phone operating systems such as Apple® and Google's® Android® have provided Application Programmer Interfaces (APIs) to allow third parties to create custom applications that may run on the standard operating systems. The custom applications can access the underlying phone hardware through the API and can provide added functionality to the phone. Numerous additional custom applications are available for phone platforms. These additional applications provide a wide variety of functions and may greatly expand the functionality of the device even years after the device was purchased.

Although APIs may be provided to encourage third-party development of custom applications, the manufacturer or designer of the device may also develop their own additional applications without reliance on third-party development.

While the smart phone industry has embraced the ability to update the firmware of the device even after the customer has purchased the device, numerous other types of electronic devices do not provide this ability. In product lines that do not allow customers to update the firmware, customers may have a difficult purchasing decision to make. A particular product may have superior hardware but lack all the desired functionality in the software on the device. In contrast, another product may have lots of desirable software functionality but the software is running on inferior hardware.

One of the obstacles to providing the ability to update the firmware/embedded software on electronic devices is the fact that many devices use a compressed file system to save memory requirements and/or space. In a compressed file system the firmware image resides in non-volatile memory in a compressed format. When the device is powered on the firmware image is decompressed, unpacked or expanded and executed.

On devices with a compressed firmware image stored in a compressed file system, any additional applications that need to be stored in the compressed file system also need to be compressed. Converting the additional applications into a compressed format within the electronic device is technically possible but does not lend itself to a high level of robustness.

First of all, hardware in most electronic devices is reduced to the minimal requirements needed to operate the device and may not be equipped to perform the compression. Furthermore, performing the compression on the electronic device may subject the compression to interruption from power outage or by the user. If the compression is not performed correctly and/or completed, the device may fail to operate and may not be able to be fixed without involving the manufacturer.

SUMMARY OF THE EMBODIMENTS

In view of the foregoing, an object according to one aspect of the present patent document is to provide a device with a customizable image and methods therefor. Preferably the device with a customizable image and methods therefor addresses, or at least ameliorates one or more of the problems described above. To this end, an electronic device is provided. In one embodiment, the electronic device comprises: a central processing unit, memory, and a network connector all in data communication; a firmware image stored in a compressed format within the memory, wherein the firmware image includes a plurality of software components; and an update agent stored within the memory and configured to provide a list of software components for communication out the network connector, wherein the electronic device is configured to communicate the list of software components out the network connector and receive a modified firmware image in a compressed format that includes at least one additional software component.

In at least one embodiment the electronic device is a display device and in some of these embodiments the display device is a television.

In another embodiment, the update agent is further configured to monitor an amount of the memory not in use by the electronic device and communicate the amount of memory out the network connector. In other embodiments, the update agent may be further configured to communicate out the network connector a list of hardware components located within the electronic device.

In yet another embodiment, the electronic device is further configured to receive and display a list of additional software components available for the electronic device.

In another embodiment a television is provided. In one embodiment, the television comprises, a central processing unit; memory in data communication with the central processing unit; a network connector in data communication with the central processing unit; and a plurality of software components stored within the memory, wherein the television is configured to communicate information out the network connector and receive at least one additional software component for installation into the memory.

In another embodiment a television is provided, wherein one of the software components is a software update agent, and wherein the software update agent is designed to collect the information from the television and communicate the information out the network connection.

In various embodiments, the information communicated may relate to various different things. In one embodiment, the information relates to hardware components within the television. In another embodiment, the information includes a size of the memory available for use.

In another embodiment, the television is further configured to receive and display a list of additional software components available for the television.

In another embodiment a method for modifying a compressed firmware image on an electronic device is provided. In one embodiment, the method comprises the steps of: expanding a compressed firmware image including a plurality of software components; running at least some of the software components; transmitting a list of the plurality of software components out a network connector; receiving a modified compressed firmware image via the network connector, wherein the modified compressed firmware image includes the plurality of software components and at least one additional software component; and replacing the compressed firmware image with the modified compressed firmware image.

In certain embodiments, the electronic device of the method is a display device. In some of those embodiments the display device is a television.

In another embodiment, the additional step of transmitting a list of hardware components located within the television out the network connector is performed prior to the receiving step.

In yet another embodiment an additional step is performed before the receiving step that includes displaying a list of additional software components available for installation on the electronic device.

In other embodiments the additional step of monitoring an amount of available memory and transmitting the amount of available memory out the network connector is performed.

As described more fully below, the apparatus and methods of the embodiments permit the updating of a firmware image/embedded software on an electronic device. Further aspects, objects, desirable features, and advantages of the apparatus and methods disclosed herein will be better understood from the detailed description and drawings that follow in which various embodiments are illustrated by way of example. It is to be expressly understood, however, that the drawings are for the purpose of illustration only and are not intended as a definition of the limits of the claimed embodiments.

DETAILED DESCRIPTION OF THE EMBODIMENTS

Figure 1:
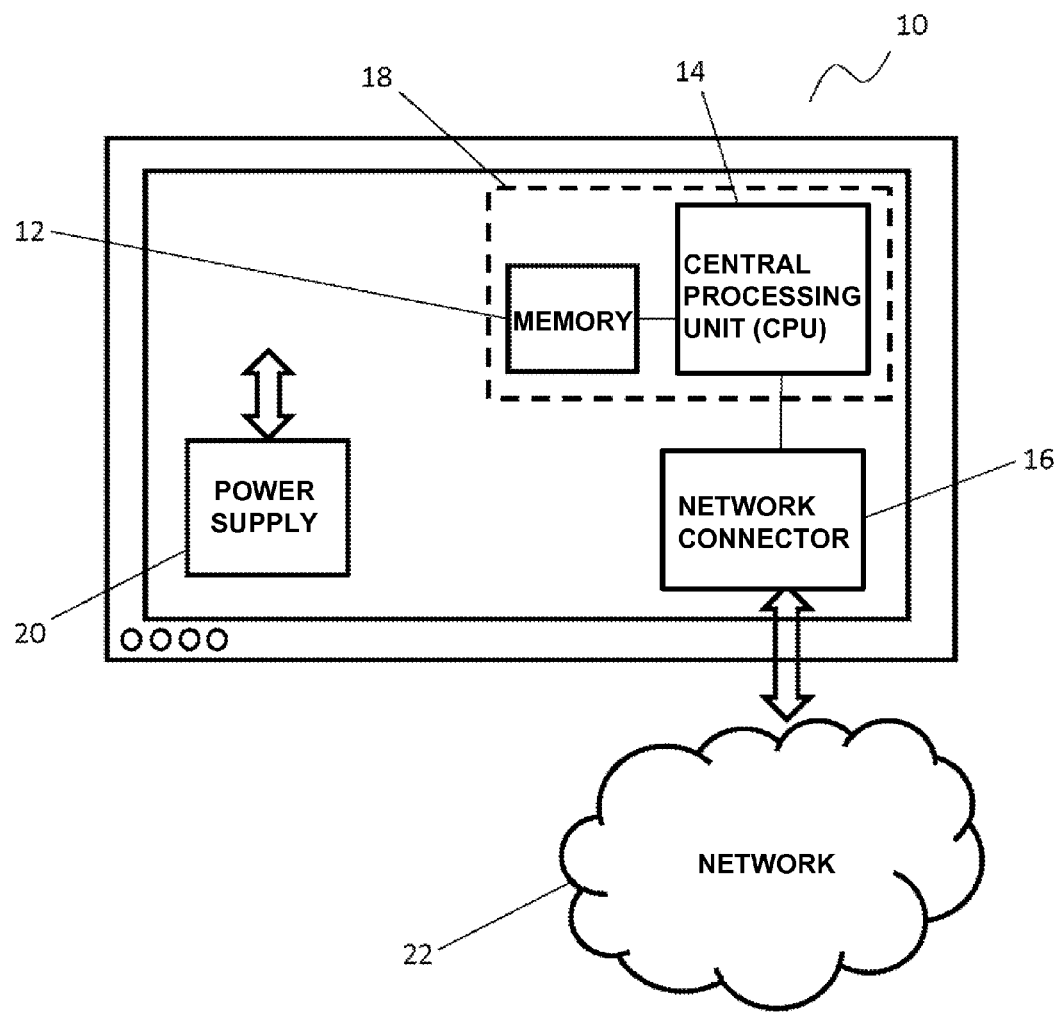
FIG. 1 illustrates an embodiment of an electronic device with customizable embedded software.

FIG. 1 illustrates an embodiment of an electronic device 10 with customizable embedded software. Electronic device 10 comprises memory 12, central processing unit (CPU) 14, network connector 16, update agent 18, and power supply 20. Although electronic device 10 is shown as a display device in FIG. 1, electronic device 10 may be any electronic device including, VCR, DVD player, Blu-Ray® player, stereo receiver, video game system, home theater controller, or any other type of electronic device 10.

In addition, where electronic device 10 is a display device the electronic device 10 may be any type of display device including a television, monitor, Liquid Crystal Display (LCD), Plasma Display Panel (PDP) or Electronic Paper Displays (EPD), to name a few.

As shown in FIG. 1, electronic device 10 includes a central processing unit (CPU) 14. In various embodiments, the CPU 14 may be of a number of different chips including a Field Programmable Gate Array (FPGA), micro-processor, Application Specific Integrated Circuit (ASIC), Digital Signal Processor (DSP), or any other type of processing chip.

The embodiment of FIG. 1 also includes memory 12. Memory 12 may include more than one type of memory. For example, electronic device 10 may have both volatile and non-volatile memory 10. Non-volatile memory maintains its data through a power cycle while volatile memory does not. Volatile memory is often Random Access Memory or RAM. Different embodiments of electronic device 10 may include different types of RAM in varying amounts. RAM includes DDR, SIMM, DIMM and numerous other configurations of RAM.

In addition to volatile memory, memory 12 may include non-volatile memory. Non-volatile memory is preferably Flash memory but may be other types of memory in other embodiments. For example, non-volatile memory may be a hard-disk drive of various sizes and shapes.

The memory 12 is in data communication with the CPU 14. Numerous types of data buses may facilitate communication between the memory 12 and the CPU 14. Memory 12 stores a firmware image which is executed by the CPU when the device is operating. Consequently, data communication between the CPU 14 and the memory 12 facilitates loading and running the firmware image.

The embodiment of FIG. 1 further comprises network connector 16. Network 22 is shown for clarity and is not a required part of the embodiment of the electronic device 10. Network 22 may be based on various types of technology. Network connector 16 may also be based on various types of technologies depending on the embodiment. For example, network connector 16 may connector to network 22 wirelessly or may be hardwired to network 22. In one embodiment, the wireless connection is based on IEEE 802.11, however, other wireless protocols may be used including Bluetooth®, 3G, EDGE, or any other wireless protocol.

In other embodiments, network connector 16 may use a wire connection to connect to network 22. In embodiments using a wired connection, Ethernet cable, phone wire, fiber optic cable, or any other type of cable connection may be used. In addition, the network 22 may also be any size or shape. For example the network 22 may be the Internet, or the network 22 may be a home local area network (LAN) or business or office LAN. The network 22 includes all size networks including the Internet, intranets, LANs and wide area networks (WANs) of all shapes and sizes.

The network connector 16 is in data communication with the CPU 14 such that the network connector 16 can receive and transmit information and data back and forth between the CPU 14 and the network 22.

The electronic device 10 further includes a power supply 20. Power supply 20 supplies power to the hardware components of electronic device 10. Power supply 20 may be an on-board supply such as a battery or may be simply a power converter to allow an off-board source to be conditioned for use with the hardware components.

Also included in the embodiment illustrated in FIG. 1, is update agent 18. Update agent 18 is a software component. Update agent 18 is shown as a dotted line around memory 12 and CPU 14 because it spans both memory 12 and CPU 14. For example, update agent 18 may be stored in memory 12 and executed on CPU 14.

Preferably update agent 18 comes as a software component already included in the firmware image on the device. Preferably, the update agent is executed by the CPU 14 whenever the electronic device 10 is powered on.

In one embodiment, the update agent inventories or surveys the software components installed on the electronic device 10 and provides the list of software components to the network connector 16 via the CPU 14 for communication over the network 22. The list may contain the different types of software components contained within the firmware image on the electronic device 10. For example, the list may contain the version of firmware being executed on the electronic device 10. The list may also contain what hardware drivers are currently part of the firmware image on electronic device 10. In other embodiments, update agent 18 may provide information about the operating system or other software components residing within the firmware image located on the electronic device 10. In general, update agent 18 may inventory, survey, or scan any of the information pertaining to the embedded software/firmware currently residing on the electronic device 10 and provide this information to the network 22 via the CPU 14 and network connector 16.

In yet another embodiment, the update agent provides information about the current hardware components located within electronic device 10 to the network 22 via the network connector and the CPU 14. For example, information about the hardware may include information about the memory such as total available memory and memory not in use by the current firmware image. Information about the available memory may be used to determine the number of additional software components that may be supported by the memory. Other information about the hardware components may include the type of CPU or type of memory. In an embodiment where the electronic device is a display device or more specifically a television, the information about the hardware components may include information about the tuner, demodulator, decoder, display type, input and/or output ports or any other feature of the display device.

In a preferred embodiment, the firmware image of the device is compressed and/or stored on a compressed file system. Firmware images are compressed to save memory 12 on electronic devices 10. For example, in embodiments where the linux operating system or a variant of the linux operating system is used, cramfs or squashfs may be used to compress the firmware image. In other embodiments, other compressed files systems may be used. In other embodiments, the file system may not be compressed and additional memory may be provided on the electronic device 10 to avoid having to compress the firmware image.

In the embodiment of FIG. 1, the electronic device 10 is configured to receive a modified firmware image in a compressed format that includes at least one additional software component. In operation, the update agent may cause information about the software and/or hardware to be transmitted to the network 22 because of a requesting server located somewhere on the network 22 or because of commands received through the electronic device 10. However, once the information has been transmitted, the electronic device 10 may receive a modified or updated firmware image.

In the preferred embodiment, where the original firmware image is compressed, the new modified firmware image received by the electronic device is also compressed. In a preferred embodiment, the new modified firmware image received by the electronic device 10 contains an additional software component that was not in the previous firmware image. For example, the modified firmware image might contain an additional application that provides the electronic device with additional functionality. The additional functionality may be something simple like an on screen clock or streaming stock quotes or may be something more complex like the ability to use picture in picture on a display.

In addition to a modified firmware image that includes additional software components, the modified firmware image may include new or updated versions of the already existing software components. Allowing the existing software components to be updated allows manufactures and application developers the opportunity to fix software bugs and enhance functionality even after the electronic device is purchased and/or shipped to the customer.

Figure 2:
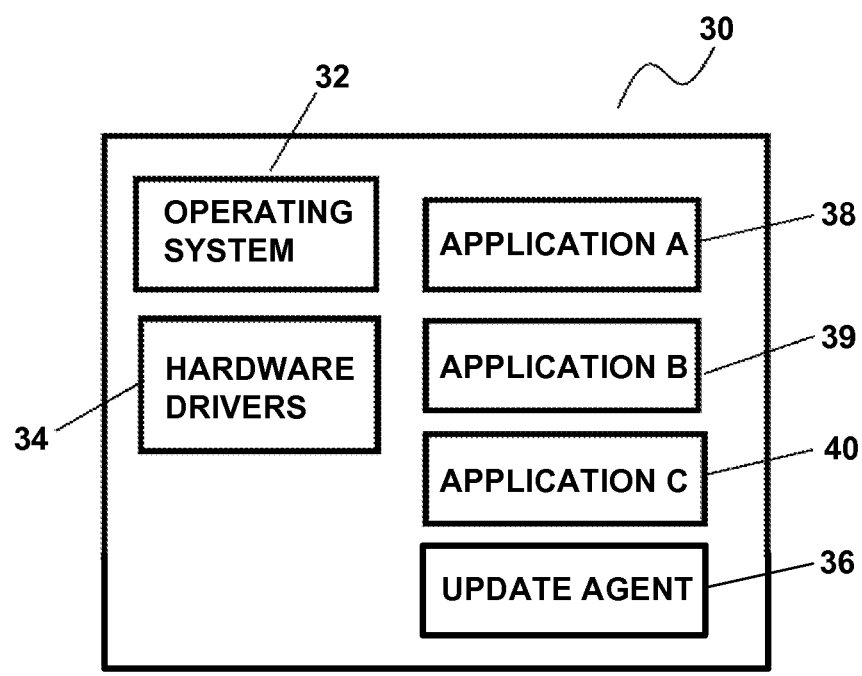
FIG. 2 illustrates a customizable firmware image/embedded software for an electronic device.

FIG. 2 illustrates a customizable firmware image/embedded software 30 for an electronic device. Generally, firmware image 30 will be composed of a number of software components. A software component may be any piece of software that is designed to perform a specific function. A software component may be as small as a function or as large as an entire application or operating system. Typical software components include operating systems, file systems, hardware drivers, applications and any other type of software component, module, or application.

In the embodiment of FIG. 2, the firmware image 30 includes an operating system 32, hardware drivers 34, update agent 36, Application A 38, Application B 39, and Application C 40. In other embodiments, the firmware image 30 may contain fewer or additional software components from those shown in the embodiment in FIG. 2.

Operating system 32 may be any operating system including Windows®, linux, Android® or any other type of operating system. Preferably, operating system 32 is an operating system designed to run on an electronic device like an embedded variant of linux or some other compact operating system.

Figure 3A:
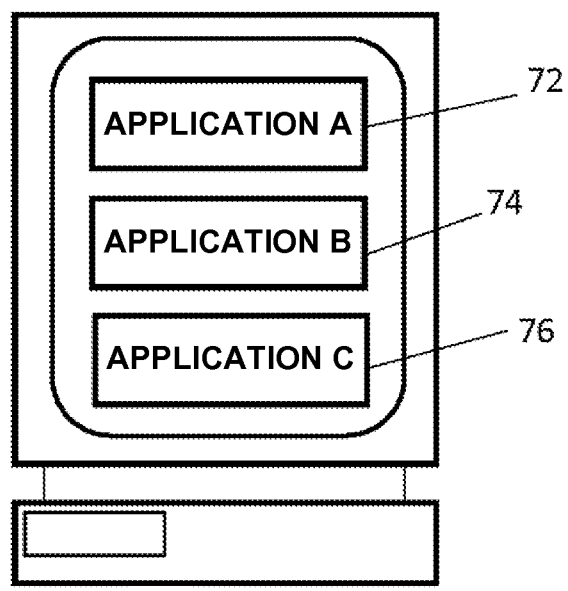
FIG. 3A illustrates software components stored in memory in an uncompressed format.
Figure 3B:
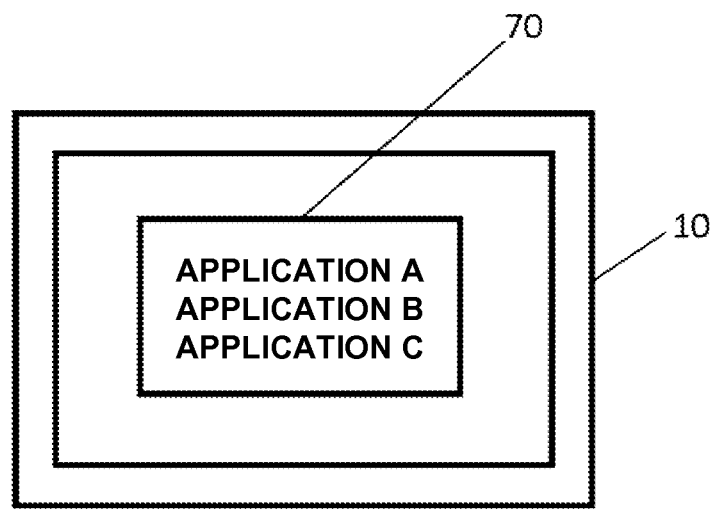
FIG. 3B illustrates software components stored in memory in a compressed format.

Firmware image/embedded software 30 may be stored in an uncompressed format or a compressed format. In the preferred embodiment, firmware image 30 is stored in a compressed format. FIG. 3A illustrates software components that are stored in memory in an uncompressed format. Each application 72, 74 and 76 is stored in memory separately and individually. In contrast, FIG. 3B illustrates software components that are stored in memory in a compressed format. The software components, applications A, B and C are combined into a single firmware image 70.

Figure 4:
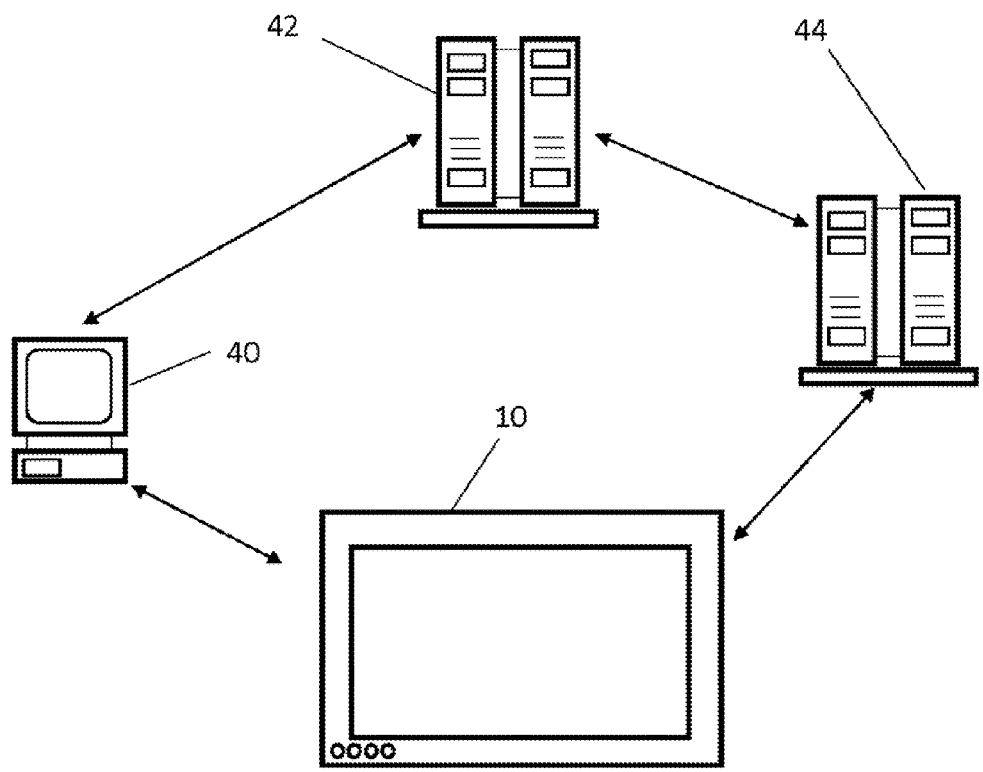
FIG. 4 illustrates one embodiment of an electronic device with customizable embedded software in operation with servers connected over a network.

One method of operation of one embodiment of the electronic device 10 with customizable embedded software will now be described with respect to FIG. 4. FIG. 4 illustrates one embodiment of an electronic device 10 with customizable embedded software in operation with servers connected over a network.

In one embodiment, the electronic device 10 requests a list of available additional applications from a server 40. In some embodiments, the request comes from the update agent. The request may be generated in response to a user request or may be an automatic request. An automatic request may be generated on a periodic basis to check for updates to the existing firmware image.

The server 40 may have a database of applications that are capable of running on the electronic device 40. In other embodiments, the server may request the information about available applications capable of running on the electronic device from a database on a different server. In the preferred embodiment, the update agent sends information to the server 40 to help the server 40 determine what applications are available for the device 10. In such an embodiment, the update agent may send a number of parameters to be considered by the server 40. For example, the update agent may send the current software version, available non-volatile memory, available RAM space, or a list of software or hardware components currently on the electronic device 10.

In one embodiment, once the server 40 determines the additional applications that may be installed on the electronic device 10, the server 40 may send a list of the available additional applications back to the electronic device 10. The server may use any number of formats for the list. In a preferred embodiment, the server sends the list in an XML format. In other embodiments a text file or spreadsheet may be used to store the list of available additional applications.

In embodiments where the electronic device 10 includes a display, such as a display device or television, the electronic device may display the list of available applications on the display. In the embodiments that include an XML format, the electronic device may parse the XML file and show the list of additional components on the display of the electronic device 10.

Once the applications are displayed, a user may select any of the available applications. Each time a user selects an application, especially if the user selects more than one application, the electronic device may compare the memory needed to install the additional applications against the available memory on the electronic device. If not enough memory is available, either RAM or non-volatile memory, to install the additional applications, a warning message may be displayed or the user may be restricted from selecting the additional application.

Once the additional applications are selected, the selected additional application information is sent to the server 40. In one embodiment, once the server 40 has the necessary information to determine what additional applications need to be installed on the electronic device 10, the server 40 may construct a recipe file. The recipe file is based on the firmware version running on the electronic device 10 and the hardware model of the electronic device 10. The recipe file contains the information about the modified firmware image that needs to be built. For example, the recipe file may contain information on the necessary drivers and middleware and other component software. In addition, the recipe file may contain any previously installed applications and any newly selected applications. The recipe file may be any number of formats including text, spreadsheet, or XML. In the preferred embodiment, the recipe file is also in XML format. One example of a recipe file using an XML format is shown below:

```
<?xml version="1.0"?>
<!-- Format Version 1 -->
<!-- Copyright (c) 2004 - 2007 UpdateLogic Inc. All rights reserved. -->
<!-- Generated by Publisher 1.10.0.0 -->
<dtv_config>
    <configversion>1</configversion>
    <model>ex2m</model>
    <modelyear>2010</modelyear>
    <driver_modules>
        <module>ac0144pn</module>
    </driver_modules>
    <middleware_modules>
        <module>ac0144pn</module>
    </middleware_modules>
    <application_modules>
        <module>HDMI_CEC</module>
        <module>IPTV</module>
        <module>BASE_APP</module>
        <module>EPG</module>
        <module>DIGITAL_TUNING</module>
    </application_modules>
</dtv_config>
```

Once the recipe file is constructed, it may be used to build a new firmware image. In one embodiment, the recipe file is sent to a build computer 42. In other embodiments, the build computer 42 and the server computer 40 may be the same computer. The build computer 42 may parse the recipe file and determine all the software components needed for the modified firmware image.

In certain embodiments, the software components reside on the build computer. In other embodiments, the software components may reside on another computer, a software component depot, or multiple other computers. The build computer may take all the software components, middleware, drivers and applications and put them in a build directory. The build computer may specify any build variables or other local variables needed to build the modified firmware image. In addition, the build computer may create a build script.

In the preferred embodiment, which includes a compressed firmware image, the build computer creates the firmware image and then compresses it. Once the compressed firmware image is created, the build machine creates a download package which the electronic device 10 can accept.

In one embodiment, an image hosting server 44 is used to download the compressed firmware image to the electronic device 10. In other embodiments, a single server may perform all the functions including the functions of the build computer and hosting computer.

In one embodiment, once the image is passed to the hosting server, a build complete signal is sent to the main server and the main server signals to the electronic device that the modified compressed firmware image is ready. Once the electronic device 10 receives the signal, the electronic device begins downloading the compressed firmware image and updating the old firmware image with the new one.

Figure 5:
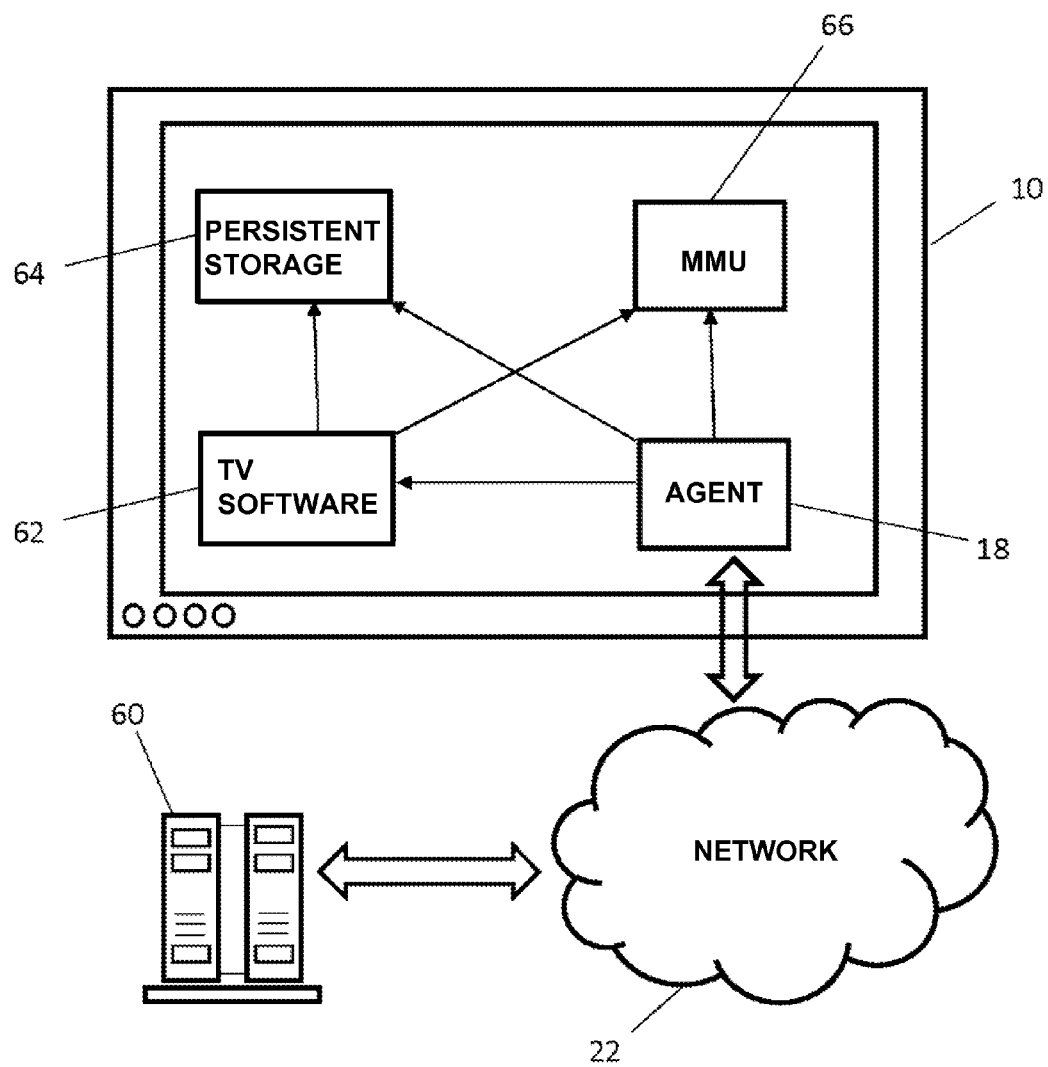
FIG. 5 illustrates one embodiment of the operation of an update agent in an electronic device with customizable embedded software.

FIG. 5 illustrates one embodiment of the operation of an update agent 18 in an electronic device with customizable embedded software. In one embodiment, the update agent 18 may monitor the memory management unit (MMU) 66, the non-volatile memory (persistent storage) 64 and electronic device software 62.

Before installing customized software into an electronic device 10, it must be verified the customized software will not only work with the electronic device 10, but also that it will fit in memory. The software agent 18 checks and monitors various capabilities of the electronic device 10. However, while the software agent 18 is operating, in the preferred embodiment, the software agent 18 does not affect normal operation of the electronic device 10.

The software agent 18 accesses or inventories the software on the electronic device. In the preferred embodiments, the software agent only really accesses information about the software on the electronic device 10 to create a software inventory for the electronic device.

In addition, the software agent may accesses the hardware of the device. Similar to the software, the software agent may build an inventory of the hardware on the electronic device 10 and therefore, may really only access information about the hardware on the electronic device 10.

The software agent 18 in general monitors and inventories both the software and hardware on the electronic device 10. In the preferred embodiment, the software agent 18 is continuously running so that it may monitor hardware usage, peak memory usage, and any changes in non-volatile memory space. The software agent 18 may also monitor the current software version and application configurations.

As discussed above, the software agent 18 may provide the information about the electronic device 10 to a server 60 via the network 22.

Although the embodiments have been described with reference to preferred configurations and specific examples, it will readily be appreciated by those skilled in the art that many modifications and adaptations of the electronic device with customizable embedded software and methods therefor described herein are possible without departure from the spirit and scope of the embodiments as claimed hereinafter. Thus, it is to be clearly understood that this description is made only by way of example and not as a limitation on the scope of the embodiments as claimed below.

What is claimed is:

1. An electronic device comprising:
   at least one processing device;
   at least one memory in data communication with the at least one processing device;
   a network connector in data communication with the at least one processing device;
   a compressed firmware image configured to be utilized by a compressed file system and thereby stored in a compressed format within the at least one memory, wherein the compressed firmware image includes a plurality of software components; and
   an update agent stored within the at least one memory and configured to survey the electronic device for information about the electronic device, the information including at least a list of the plurality of software components, the update agent further configured to provide the list of software components for communication out the network connector, wherein the electronic device is configured to:
   communicate at least the list of software components out the network connector;
   responsively receive a modified replacement compressed firmware image configured to be utilized by the compressed file system in a compressed format that includes at least some of the plurality of software components and at least one additional software component; and
   replace the compressed firmware image with the modified replacement compressed firmware image, thereby storing the modified replacement compressed firmware image in a compressed format within the at least one memory.

2. The electronic device of claim 1, wherein the electronic device is a display device.

3. The electronic device of claim 2, wherein the display device is a television.

4. The electronic device of claim 1, wherein the update agent is further configured to monitor an amount of the at least one memory not in use by the electronic device and communicate the amount of the at least one memory out the network connector.

5. The electronic device of claim 1, wherein the update agent is further configured to communicate out the network connector a list of hardware components of the electronic device.

6. The electronic device of claim 1, wherein the electronic device is further configured to receive and display a list of additional software components available for the electronic device.

7. A television comprising:
   at least one processing device;
   at least one memory in data communication with the at least one processing device and configured to store a compressed firmware image configured to be utilized by a compressed file system and thereby stored in a compressed format, the compressed firmware image comprising a plurality of software components; and
   a network connector in data communication with the at least one processing device;
   wherein the at least one processing device is configured to:
   survey the television for information about the television, the information including at least a list of the plurality of software components;
   communicate the at least the list of software components out the network connector;
   responsively receive a modified compressed firmware image configured to be utilized by the compressed file system, the modified compressed firmware image including the plurality of software components and at least one additional software component; and
   replace the compressed firmware image with the modified compressed firmware image, thereby storing the modified replacement compressed firmware image in a compressed format within the at least one memory.

8. The television of claim 7, wherein one of the software components is a software update agent, and wherein the software update agent is designed to collect the information about the television and communicate the information out the network connection.

9. The television of claim 7, wherein the information about the television relates to hardware components of the television.

10. The television of claim 7, wherein the information about the television comprises a size of the at least one memory available for use.

11. The television of claim 7, wherein the television is further configured to receive and display a list of additional software components available for the television.

12. A method comprising:
   expanding, by at least one processing device of an electronic device of a compressed firmware image of the electronic device, the compressed firmware image configured to be utilized by a compressed file system and thereby stored in a compressed format within at least one memory of the electronic device, the compressed firmware image comprising a plurality of software components;
   running by the at least one processing device of at least one of the plurality of software components;
   surveying, by an update agent stored within the at least one memory, of information about the electronic device, the information including at least a list of the plurality of software components;

transmitting by the electronic device of the list of software components out a network connector;
responsively receiving by the electronic device a modified compressed firmware image via the network connector, wherein the modified compressed firmware image comprises at least some of the plurality of software components and at least one additional software component, and the modified compressed firmware image is configured to be utilized by the compressed file system; and
replacing by the at least one processing device of the compressed firmware image with the modified compressed firmware image, thereby storing the modified replacement compressed firmware image in a compressed format within the at least one memory.

13. The method of claim 12, wherein the electronic device is a display device.

14. The method of claim 13, wherein the display device is a television.

15. The method of claim 12 further comprising the electronic device transmitting a list of hardware components of the television out the network connector prior to the electronic device responsively receiving the modified compressed firmware image.

16. The method of claim 12 further comprising the electronic device displaying a list of additional software components available for installation on the electronic device prior to the electronic device responsively receiving the modified compressed firmware image.

17. The method of claim 12 further comprising the at least one processing device monitoring an amount of available memory and transmitting the amount of available memory out the network connector prior to the electronic device responsively receiving the modified compressed firmware image.

* * * * *